United States Patent
Rohn et al.

(10) Patent No.: US 10,857,509 B2
(45) Date of Patent: Dec. 8, 2020

(54) STIRRING ELEMENT DEVICE

(71) Applicant: EKATO Rühr- und Mischtechnik GmbH, Schopfheim (DE)

(72) Inventors: Nicole Rohn, Rheinfelden (DE); Horst Beck, Schopfheim (DE); Reinhard Schmidt, Maulburg (DE)

(73) Assignee: EKATO Rühr- und Mischtechnik GmbH, Schopfheim (DE)

( * ) Notice: Subject to any disclaimer, the term of this patent is extended or adjusted under 35 U.S.C. 154(b) by 0 days.

(21) Appl. No.: 16/609,861

(22) PCT Filed: May 9, 2018

(86) PCT No.: PCT/EP2018/062118
§ 371 (c)(1),
(2) Date: Oct. 31, 2019

(87) PCT Pub. No.: WO2018/206710
PCT Pub. Date: Nov. 15, 2018

(65) Prior Publication Data
US 2020/0078746 A1    Mar. 12, 2020

(30) Foreign Application Priority Data

May 10, 2017    (DE) .................. 10 2017 110 079

(51) Int. Cl.
*B01F 7/00*    (2006.01)
*B01J 19/18*   (2006.01)
(Continued)

(52) U.S. Cl.
CPC ............ *B01F 7/0065* (2013.01); *B01F 7/003* (2013.01); *B01F 7/00141* (2013.01);
(Continued)

(58) Field of Classification Search
CPC ............... B01F 7/0065; B01F 7/00641; B01F 7/00633; B01F 7/004; B01F 7/00433;
(Continued)

(56) References Cited

U.S. PATENT DOCUMENTS 330,555 A * 11/1885 Brandenberger ... B01F 7/00391
    366/325.3
778,922 A    1/1905 Traut
(Continued)

FOREIGN PATENT DOCUMENTS

CN    1562487 A    1/2005
DE    101 10 910 C1    11/2002
(Continued)

OTHER PUBLICATIONS

German Search Report dated Dec. 15, 2017 issued in corresponding DE patent application No. 10 2017 110 079.2 (and English translation).
(Continued)

*Primary Examiner* — Lessanework Seifu
(74) *Attorney, Agent, or Firm* — Posz Law Group, PLC

(57) ABSTRACT

A stirring element device, in particular for mixing media with a wide range of viscosities, in particular for a polycondensation reactor, includes at least one inner stirring blade and at least one outer stirring blade which are rotatable about a common axis of rotation, wherein at least the inner stirring blade is inclined at least section-wise relative to the
(Continued)

axis of rotation. The inner stirring blade is arranged entirely in a subregion around the axis of rotation which is equivalent to a cylinder sector with a circular sector of less than 360° as base area.

18 Claims, 10 Drawing Sheets

(51) Int. Cl.

| | | |
|---|---|---|
| *B01F 7/20* | (2006.01) | |
| *B01F 7/24* | (2006.01) | |
| *B01F 15/06* | (2006.01) | |
| *B01J 19/00* | (2006.01) | |
| *B01J 19/06* | (2006.01) | |

(52) U.S. Cl.
CPC ...... *B01F 7/00158* (2013.01); *B01F 7/00275* (2013.01); *B01F 7/00416* (2013.01); *B01F 7/20* (2013.01); *B01F 7/247* (2013.01); *B01F 15/066* (2013.01); *B01J 19/0013* (2013.01); *B01J 19/0066* (2013.01); *B01J 19/06* (2013.01); *B01J 19/18* (2013.01); *B01F 2215/0036* (2013.01)

(58) Field of Classification Search
CPC .......... B01F 7/0416; B01F 7/003; B01F 7/20; B01F 7/247; B01F 15/065; B01F 15/066; B01J 19/0066; B01J 19/18; B01J 19/06
See application file for complete search history.

(56) References Cited

U.S. PATENT DOCUMENTS

| | | | |
|---|---|---|---|
| 1,734,632 A | 11/1929 | Merrill | |
| 4,509,860 A | 4/1985 | Lasar | |
| 7,131,765 B2 * | 11/2006 | Backhaus | ................ A21C 1/02 366/149 |
| 2004/0233780 A1 | 11/2004 | Oliveira Picho | |

FOREIGN PATENT DOCUMENTS

| | | |
|---|---|---|
| DE | 20 2014 010 060 U1 | 3/2015 |
| EP | 0 063 171 A2 | 10/1982 |
| EP | 1 449 576 A1 | 8/2004 |
| EP | 2 781 254 A1 | 9/2014 |
| FR | 2 893 517 A1 | 5/2007 |
| GB | 411763 A | 6/1934 |
| JP | H10-265226 A | 10/1998 |
| JP | 2015-213886 A | 12/2015 |

OTHER PUBLICATIONS

International Search Report of the International Searching Authority dated Oct. 22, 2018 issued in corresponding International Patent Application No. PCT/EP2018/062118.
International Preliminary Report on Patentability of the International Searching Authority dated Nov. 12, 2019 issued in corresponding International Patent Application No. PCT/EP2018/062118.

* cited by examiner

STIRRING ELEMENT DEVICE

CROSS REFERENCE TO RELATED APPLICATIONS

This application is a U.S. national stage application of PCT/EP2018/062118 filed on May 9, 2018, which is based on German Patent Application No. 10 2017 110 079.2 filed on May 10, 2017, the contents of which are incorporated herein by reference.

PRIOR ART

Stirring element devices with inner and outer stirring blades have already been proposed. The Japanese document JP1996150330 discloses a stirring element with a helical inner stirring blade, which generates a movement of a medium for mixing from bottom to top, and with two outer stirring blades, which are angled relative to an axis of rotation and which generate a movement of a medium for mixing from top to bottom. Here, the helix loops around the axis of rotation multiple times and extends over a region around the axis of rotation which amounts to 360°.

It is the object of the invention to provide a generic device having improved stirring characteristics.

Advantages of the Invention

The invention proceeds from a stirring element device, in particular for mixing media with a wide range of viscosities, in particular for a polycondensation reactor, having at least one inner stirring blade and at least one outer stirring blade which are rotatable about a common axis of rotation, wherein at least the inner stirring blade is inclined at least section-wise relative to the axis of rotation.

It is proposed that at least the inner stirring blade is arranged entirely in a subregion around the axis of rotation which is equivalent to a cylinder sector with a circular sector of less than 360°, in particular of less than 180° and preferably of less than 90°, as base area. In this way, it is advantageously possible to achieve improved stirring characteristics. Good thorough miscibility of a medium for mixing, in particular over an entire volume region swept by the stirring element device in a rotation operating mode, can advantageously be made possible. It is advantageously possible for an axial flow, in particular a vertical flow, parallel to the axis of rotation in an inner region to be optimized, whereby a circulation of the medium for mixing, in particular in the central region close to the axis of rotation, can advantageously be further improved. Furthermore, in particular by means of the design of the inner stirring blade which is restricted to a cylinder sector, it is advantageously possible to avoid regions which can impede the vertical flow, for example owing to surfaces which are partially perpendicular to the generated vertical flow.

A "wide range of viscosities" is to be understood in particular to mean a range of viscosities which extends at least over 200 Pas, preferably at least over 400 Pas and preferably at least over 600 Pas. The range of viscosities particularly preferably extends at least from 5 Pas to 750 Pas. A "stirring blade" is to be understood in particular to mean a part of the stirring element device which has a continuous surface which is in particular configured for accelerating a medium for mixing which, during a rotation of the stirring blade around the axis of rotation, impinges on a stirring face formed as a surface of the stirring blade. Each stirring blade of the stirring element device is in particular at least substantially of shell-like and/or integral form. The stirring blade preferably has a coherent free surface, in particular stirring face, which is preferably free from recesses and/or interruptions. In particular, the stirring blade is configured for generating, during a rotation about the axis of rotation, a flow in a medium for mixing.

"Integral" is to be understood in particular to mean at least cohesively connected, for example by means of a welding process, an adhesive bonding process, an injection-molding process and/or some other process that appears expedient to a person skilled in the art, and/or advantageously formed in one piece, for example by production from one casting and/or by production in a single-component or multi-component injection molding process, and advantageously from a single blank. The statement that a stirring blade is "inclined relative to the axis of rotation" is to be understood in particular to mean that the stirring blade, in particular the stirring face, has at least one tangential plane which comprises at least one surface normal which encloses an inclination angle of less than 90°, preferably less than 89° or preferably less than 87°, with the axis of rotation. An "inclination angle" is to be understood in particular to mean an angle enclosed between at least one surface normal of at least one tangential plane, which lies on a point on a face of a component, for example the stirring face of the stirring blade, and the axis of rotation. In particular, a smallest inclination angle of the inner stirring blade, in particular of the stirring face of the inner stirring blade, lies in a range between 50° and 90°, preferably between 60° and 90°, preferably between 70° and 90°, or particularly preferably between 80° and 90°. In particular, a smallest inclination angle of the outer stirring blade, in particular of the stirring face of the outer stirring blade, lies in a range between 10° and 90°, preferably between 20° and 90°, preferably between 30° and 90° or particularly preferably between 40° and 90°. A cylinder axis of the cylinder sector is preferably identical to the axis of rotation.

It is furthermore proposed that the stirring element device has at least one corresponding inner stirring blade, which is arranged entirely in a corresponding subregion around the axis of rotation which is equivalent to a corresponding cylinder sector with a circular sector as base area, wherein the subregion and the corresponding subregion do not overlap. In this way, stirring characteristics can be further improved. Good thorough miscibility of a medium for mixing, in particular over an entire volume region swept by the stirring element device in a rotation operating mode, can advantageously be made possible. It is advantageously possible for an axial flow, in particular a vertical flow, parallel to the axis of rotation in an inner region to be optimized, whereby a circulation of the medium for mixing, in particular in the central region close to the axis of rotation, can advantageously be further improved. Furthermore, by means of the corresponding stirring blade, a mass distribution of the stirring element device can advantageously be optimized, whereby smooth running of the stirring element device can be improved.

In particular, the inner stirring blade and the corresponding inner stirring blade are of at least substantially identical design, wherein, in particular, the corresponding inner stirring blade is arranged so as to be rotationally offset in relation to the inner stirring blade by an angle which preferably amounts to 180°. "Substantially identical" is to be understood in particular to mean congruent, in particular disregarding small shape deviations that lie in particular in a manufacturing-induced tolerance range. Preferably, a cylinder axis of the corresponding cylinder sector is identical to the axis of rotation. It is conceivable that, between the subregion and the corresponding subregion, there is at least one first subregion and/or at least one second subregion about the axis of rotation which equates in each case to a cylinder sector with a circular sector of less than 360°, in particular of less than 180° and preferably of less than 90°, as base area, wherein the subregion, the corresponding subregion, and at least the first subregion and/or the second subregion do not overlap. Preferably, the first subregion and the second subregion have base areas congruent with respect to one another. In particular, the base area of the first subregion and of the second subregion is equivalent to a circular sector of greater than 45°, preferably of greater than 70°, advantageously of greater than 100°, preferably of greater than 120° and in particular of greater than 130°.

It is furthermore proposed that the stirring element device has a rotary shaft which is centered around the axis of rotation and which, at least section-wise, makes contact with the inner stirring blade along a longitudinal direction of the rotary shaft. An advantageous transmission of force can be achieved in this way. An opposing force, in particular generated by the medium for stirring, can advantageously be distributed over multiple contact regions and/or over an extended contact region, whereby a more lightweight construction can advantageously be made possible. It is furthermore advantageously possible for dead spaces, in particular between the rotary shaft and the inner stirring blade in which the medium for stirring is substantially static in a stirring operating mode, to be avoided. The rotary shaft is in particular of rotationally symmetrical design. In particular, the rotary shaft is centered around the axis of rotation, wherein an axis of rotation symmetry of the rotary shaft is identical to the axis of rotation. In particular, the inner stirring blade, preferably an edge of the stirring face of the inner stirring blade, and/or the corresponding inner stirring blade, preferably an edge of the stirring face of the corresponding inner stirring blade, makes direct contact with the rotary shaft, in particular in a manner free from supporting arms and/or separate connecting elements. In particular, the rotary shaft is formed integrally with the inner stirring blade and/or with the corresponding inner stirring blade.

It is furthermore proposed that the outer stirring blade is arranged entirely in a further subregion around the axis of rotation which is equivalent to a further cylinder sector with a circular sector of less than 360°, in particular of less than 180° and preferably of less than 90°, as base area. In this way, particularly advantageous stirring characteristics can be provided. Good thorough miscibility of a medium for mixing, in particular over an entire volume region swept by the stirring element device in a rotation operating mode, can advantageously be made possible. It is advantageously possible for an axial flow, in particular a vertical flow, parallel to the axis of rotation in a region outside of the center to be optimized, whereby a circulation of the medium for mixing can advantageously be further improved.

In particular, the outer stirring blade is spaced apart in a radial direction from the axis of rotation. Preferably, a spacing of the outer stirring blade from the axis of rotation is, at every point, greater than a spacing of the inner stirring blade and/or of the corresponding inner stirring blade at every point. In particular, regions swept by the inner stirring blades in a rotation operating mode do not overlap a region swept by the outer stirring blade. The outer stirring blade is preferably inclined relative to the axis of rotation. In particular, the stirring element device has at least one corresponding outer stirring blade which is arranged entirely in a further corresponding subregion around the axis of rotation which is equivalent to a further corresponding cylinder sector with a circular sector as base area, wherein the further subregion and the further corresponding subregion do not overlap. It is conceivable that the further subregion and/or the further corresponding subregion do not overlap the subregion and/or the corresponding subregion, or that the subregions at least partially overlap one another. It is furthermore conceivable that the further subregion is identical to the subregion and/or that the further corresponding subregion is identical to the corresponding subregion. The outer and/or the corresponding outer stirring blade is in particular connected to the stirring shaft by means of at least one supporting arm of the stirring element device. Preferably, the outer and/or the corresponding outer stirring blade is fastened at at least one end, preferably an upper end in a vertical direction in an operating state, to the supporting arm, in particular in non-positively locking, positively locking and/or cohesive fashion.

If the inner stirring blade and the outer stirring blade, in particular all stirring blades, have identical angular speeds in at least one rotation operating mode, an advantageously simple construction can be made possible. It is advantageously possible for a single drive to be used for generating the rotational movement of the inner and of the outer stirring blade, preferably of all stirring blades. Furthermore, it is advantageously possible to realize a uniform circulation. In particular, the angular speeds of the inner stirring blade and of the outer stirring blade are coupled to an angular speed of the rotary shaft, which may in particular be variably adjustable. In particular, all stirring blades are rigidly connected to one another, preferably by means of the rotary shaft and/or at least one supporting arm.

It is furthermore proposed that the inner stirring blade and the outer stirring blade are curved differently. In this way, it is advantageously possible to generate a different flow direction in different subregions of the medium for mixing, whereby advantageous stirring characteristics can be provided. It is advantageously possible for an improved circulation of a medium for mixing to be achieved in the stirring operating mode. "Curved differently" is to be understood in particular to mean that the curvatures, preferably the curvature directions, of the stirring blades are substantially different. "Substantially different curvatures" is to be understood in particular to mean that one stirring blade has an in particular mean, preferably entire, change in direction between two ends, for example an upper end in an operational state and a lower end in the operational state, which is at least 30%, preferably at least 60%, preferably at least 90% or particularly preferably at least 120%, greater than an in particular mean, preferably entire, change in direction of another stirring blade. "Substantially different curvature directions" is to be understood in particular to mean that at least one of the inner stirring blades and/or of the outer stirring blades has a left-handed curvature, whereas at least one inner stirring blade and/or outer stirring blade that differs from the stirring blade has a right-handed curvature.

If the inner stirring blade is formed at least partially as a screw centered around the axis of rotation, advantageous flow conditions in the medium for mixing can be achieved in the stirring operating mode. Furthermore, a uniform force action, independent of a vertical position, on the medium for mixing can advantageously be realized in the region of the screw in the stirring operating mode. In particular, the inner stirring blade has at least one surface in the form of a helical face. In particular, the inner stirring blade has an inclination angle of 90° at an inner edge which is closest to the rotary shaft in the installed state, whereas the outer edge, situated opposite the inner edge, of the inner stirring blade has the smallest inclination angle of the stirring blade. All inclination angles of the inner stirring blade between the inner edge and the outer edge lie in particular between the smallest inclination angle and 90°. It is conceivable for the corresponding inner stirring blade to be designed at least partially as a screw which is offset relative to the inner stirring blade and which is centered around the axis of rotation. In particular, it is conceivable for the inner stirring blade and the corresponding inner stirring blade together to form a two-threaded screw, in particular two congruent helices which are offset by half of one thread pitch and/or half of one rotation and which in particular have an identical thread direction. It is furthermore conceivable for the outer stirring blade, the corresponding outer stirring blade and/or at least one further stirring blade which differs from the outer and inner stirring blades to be designed as a screw which is centered around the axis of rotation, wherein the respective inner edge, situated closest to the axis of rotation, may be spaced apart from the rotary shaft.

It is furthermore proposed that the inner stirring blade has a thread pitch which amounts to at least three times, preferably at least four times, preferably at least five times and particularly preferably at least six times the total extent of the inner stirring blade parallel to the axis of rotation. A flow of the medium for mixing can thus advantageously be optimized. An interruption-free flow parallel to the axis of rotation in the region of the inner stirring blade can advantageously be made possible. A "thread pitch" is to be understood to mean in particular an extent parallel to the axis of rotation, within which a screw and/or a helix covers one full rotation. In particular, the corresponding inner stirring blade has a corresponding thread pitch identical to the thread pitch. In particular, the thread pitch is constant over the entire inner stirring blade and/or the entire corresponding inner stirring blade. It is conceivable for the outer stirring blade, the corresponding outer stirring blade and/or at least one further stirring blade which differs from the outer and inner stirring blades to have a thread pitch which is greater than, in particular amounts to at least two times, preferably amounts to at least three times, a total extent of the respective stirring blade parallel to the axis of rotation. In particular, the outer stirring blade and the corresponding outer stirring blade have an identical thread pitch. In particular, the inner stirring blade and/or the corresponding inner stirring blade has a thread pitch which is greater, in particular at least 20%, preferably 30% and particularly preferably 40% greater, than the outer stirring blade, the corresponding outer stirring blade and/or at least one further stirring blade that differs from the outer and inner stirring blades.

It is furthermore proposed that the stirring element device has at least one surface stirring blade which, in at least one operating state, is arranged at least partially, preferably entirely, above the outer stirring blade and/or the inner stirring blade and/or at least one further stirring blade that differs from the outer and inner stirring blades. Good thorough mixing of the medium for mixing can advantageously be achieved in this way. A dead space above the inner and/or the outer stirring blade can advantageously be avoided. It is conceivable for the surface stirring blade to be adaptable to an, in particular intended, filling level of the medium for mixing. In particular, the surface stirring blade is configured for rotating, in a stirring operating mode, a short distance below a surface of the medium for mixing, whereby a surface exchange of the medium for mixing can advantageously be improved, which is necessary in particular for effective polycondensation. The surface stirring blade may in particular be designed to be removable, in particular removable from the supporting arm, whereby modular adaptability to different intended filling levels and/or different vessels can advantageously be made possible. The surface stirring blade is preferably designed to be inclined relative to the axis of rotation, whereby a surface exchange can advantageously be further improved.

It is furthermore proposed that the stirring element device has at least one corresponding outer stirring blade and at least one anchor element which connects at least the outer stirring blade, in particular at at least a lower end, to the corresponding outer stirring blade, in particular in cohesive fashion, wherein the anchor element has an anchor stirring face which is oriented relative to the axis of rotation. In this way, it is advantageously possible for stirring characteristics, in particular in the region of a base of a vessel, to be improved, whereby a total stirring power can advantageously be increased. It is furthermore advantageously possible for a stability of the stirring element device to be increased. A "lower end" is to be understood in particular to mean an edge of the outer stirring blade which, in a stirring operating mode, is situated furthest remote from the surface of a medium for stirring. The anchor stirring face may be oriented perpendicularly and/or in an inclined manner relative to the axis of rotation. The term "oriented relative to the rotary face" is to be understood in particular to mean that the anchor stirring face has a surface normal which is at an angle relative to the axis of rotation. In particular, the angle between the surface normal of the anchor stirring face and the axis of rotation amounts to at least 45°, preferably at least 60°, preferably at least 75° or particularly preferably at least 90°.

If the rotary shaft makes contact with the anchor element and is fixedly connected to the anchor element, a stability of the stirring element device can advantageously be increased, whereby a service life can advantageously be lengthened. Furthermore, it is advantageously possible for a distribution and/or transmission of force to be improved, for example by virtue of forces which act on the outer stirring blade and on the corresponding outer stirring blade being advantageously distributed between multiple connecting points. In particular, the anchor element and the rotary shaft are connected in positively locking, non-positively locking and/or cohesive fashion and/or are advantageously formed integrally.

It is furthermore proposed that the stirring element device has at least one further outer stirring blade which, in a radial direction, has a greater spacing to the axis of rotation than the outer stirring blade. In this way, a region that can be thoroughly mixed by means of the stirring element device can advantageously be enlarged, whereby a greater amount of the medium for mixing can advantageously be mixed simultaneously. In this way, an efficiency can advantageously be increased. Preferably, a spacing of the further outer stirring blade from the axis of rotation is, at every point, greater than a spacing of the outer stirring blade and/or of the corresponding outer stirring blade at every point. In particular, regions swept by the further outer stirring blade in a rotation operating mode do not overlap a region swept by the outer stirring blade and/or the corresponding outer stirring blade. The further outer stirring blade is preferably inclined relative to the axis of rotation. In particular, the stirring element device has at least one corresponding further outer stirring blade which, in the rotation operating mode, passes through an at least substantially identical region to the further outer stirring blade. The further outer and/or the further corresponding outer stirring blade is in particular connected to the stirring shaft by means of the supporting arm. Preferably, the outer and/or the corresponding outer stirring blade is fastened at at least one end, preferably an upper end in a vertical direction in an operating state, to the supporting arm, in particular in non-positively locking, positively locking and/or cohesive fashion. The further outer stirring blade and/or the further corresponding outer stirring blade preferably has a helical curvature. In particular, the further outer stirring blade and the corresponding further outer stirring blade have an identical thread direction and/or curvature.

It is furthermore proposed that, as viewed along the axis of rotation, the outer stirring blade has a curvature direction opposite to the curvature direction of the further outer stirring blade. In this way, stirring characteristics can advantageously be improved, in particular with regard to a circulation in an, in particular outer, region between the outer stirring blades and the further outer stirring blades. In particular, the further outer stirring blade and/or the corresponding further outer stirring blade is designed at least partially as a right-handed helix, and the outer stirring blade and/or the corresponding outer stirring blade is designed as an at least partially left-handed helix.

It is alternatively conceivable that the further outer stirring blade and/or the corresponding further outer stirring blade has an identical curvature and/or thread direction to the outer stirring blade and/or the corresponding outer stirring blade. In this way, stirring characteristics can advantageously be improved, in particular with regard to a circulation in an, in particular inner, region between the outer stirring blades and the inner stirring blades. In particular, the further outer stirring blade, the corresponding further outer stirring blade, the outer stirring blade and/or the corresponding outer stirring blade are designed as an at least partially right-handed helix.

It is furthermore proposed that a region swept by the outer stirring blade in a rotation operating mode and a further region swept by the further outer stirring blade in a rotation operating mode are radially spaced apart from one another, forming an intermediate space which is configured for receiving a heating and/or cooling register, which is in particular of substantially radially symmetrical design with respect to the axis of rotation. In this way, flow conditions advantageous for temperature control can advantageously be created, for example by virtue of a circulating flow in the rotation operating mode running at least partially vertically upward on one side of the intermediate space and running at least partially vertically downward on an opposite side. In this way, temperature control of the medium for mixing can advantageously be optimized and/or simplified. In particular, in all angular positions in the rotation operating mode, the intermediate space is not covered by parts of the stirring element device, in particular stirring blades.

It is furthermore proposed that the further outer stirring blade has a free end which tapers to a point. In this way, it is advantageously possible for a region which is swept by the stirring blades, in particular the further outer stirring blade, in the rotation operating mode to be optimized. It is advantageously possible for dead spaces to be avoided. Mixing of the medium for mixing can advantageously be optimized in the vicinity of a vessel wall.

It is furthermore proposed that the inner stirring blade and/or the corresponding inner stirring blade has at least one recess. A "recess" is to be understood in particular to mean a subregion of the inner stirring blade which defines a volume which is free from material of the inner stirring blade and which is arranged within a smallest possible convex envelope which just still encompasses the inner stirring blade. For example, the recess may have at least one depression and/or embossment of the inner stirring blade. The recess is preferably formed as an aperture of the inner stirring blade. The inner stirring blade and/or the corresponding inner stirring blade advantageously has a multiplicity of identical, preferably periodically arranged recesses. In this way, in particular, a flexible design of the inner stirring blade and/or of the corresponding inner stirring blade can be made possible. The inner stirring blade and/or the corresponding inner stirring blade can advantageously be designed to be adapted for use in a particular viscosity range.

It is furthermore proposed that the anchor element is designed to be curved along its main extent direction. A "main extent direction" of an object is to be understood here in particular to mean a direction which runs parallel to a longest edge of a smallest geometrical cuboid which just still completely encompasses the object. In particular, a curvature of the anchor element has at least one inflection point. In this context, an "inflection point" is to be understood to mean a point at which the curvature of the anchor element undergoes a change in direction. The anchor element preferably has an S-shaped curvature. The inflection point of the curvature of the anchor element particularly preferably lies on the axis of rotation. In particular, the curvature of the anchor element has a curvature angle of at least 5°, advantageously of at least 10°, particularly advantageously of at least 15° and preferably of at least 20°. A "curvature angle" is to be understood in this context in particular to mean an angle span between a first straight line, which runs along an orientation of an outer end of the anchor element, and a second straight line, which runs along an orientation of the anchor element at the inflection point. In this way, it is possible in particular for stirring characteristics, in particular in the region of the base of the vessel, to be further improved. A total stirring power of the stirring element device can advantageously be improved.

The stirring element device advantageously has at least one vane element which is arranged on the anchor element and/or on the outer stirring blade. A "vane element" is to be understood in particular to mean an element which forms at least a part of a vane. A "vane" is to be understood in particular to mean a coherent subregion of the stirring element device which defines at least one coherent surface which, during a rotational movement of the stirring element device, effects a displacement of the medium for mixing. In particular, the surface may be curved, advantageously concavely curved. It is preferable if the vane element together with at least one subregion of at least one of the stirring blades forms the vane. In particular, the vane element is of plate-like design. A main extent direction of the vane element advantageously runs at least substantially perpendicular to a main extent direction of the anchor element. A "plate-like object" is to be understood in particular to mean an object whose smallest geometrical cuboid which just still completely encompasses the object has a thickness which is at most 50%, in particular at most 20%, advantageously at most 10% and preferably at most 5% of a length and/or a width of the cuboid. The expression "at least substantially perpendicular" is intended here to define in particular an orientation of a direction relative to a reference direction, wherein the direction and the reference direction, in particular as viewed in a plane, enclose an angle of 90°, and the angle has a maximum deviation of in particular less than 45°, advantageously less than 35°, particularly advantageously less than 25° and preferably less than 20°. The vane element is preferably fixedly connected to the anchor element and/or to the outer stirring blade. The vane element is particularly preferably formed integrally with the anchor element and/or with the outer stirring blade, and in particular, the vane element is welded to the anchor element and/or to the outer stirring blade. It would alternatively be possible for the vane element to be adhesively bonded and/or screwed and/or riveted to the anchor element and/or to the outer stirring blade. In particular, the vane element is formed from an identical material in relation to the material of the anchor element and/or of the outer stirring blade. It would alternatively be possible for the vane element to be formed from a different material in relation to the material of the anchor element and/or of the outer stirring blade. The vane element is particularly preferably connected to the anchor element at a subregion of the anchor element which is spaced apart to a maximum extent from the axis of rotation. In particular, the vane element is connected to an outer edge, which is advantageously curved in the direction of the axis of rotation, of the anchor element. The vane element is advantageously of at least substantially triangular form. "At least substantially triangular" is to be understood in particular to mean that a projected area of the object onto its main extent plane is at least 70%, advantageously at least 80%, particularly advantageously at least 90% and preferably entirely congruent with at least one geometrical triangle. It would alternatively be possible for the vane element to be of at least substantially partially circular form. In particular, a first side of the vane element is predominantly, preferably entirely, connected to the anchor element and/or to the outer stirring blade. It is preferable if the vane element together with a subregion of the anchor element and a subregion of the outer stirring blade forms the vane. The stirring element device advantageously has a further vane element which is connected to an oppositely situated further subregion of the anchor element and/or to the corresponding outer stirring blade. In this way, it is possible in particular to achieve advantageous flow characteristics of the stirring element device. A low flow over the anchor element can advantageously be achieved.

Also proposed is a system, in particular stirring and/or reactor system, having a stirring element device and having a vessel which at least partially engages around the stirring element device. In particular, the vessel and the stirring element device are coordinated with one another in terms of their dimensions. Preferably, a region described by the stirring blades in the rotation operating mode equates substantially to an internal dimension of the vessel filled with the medium for mixing. The statement that the vessel "at least partially engages around" the stirring element device is to be understood in particular to mean that at least 80%, preferably at least 90% or preferably 100% of the stirring element device is surrounded in an installed state by the vessel. By means of such a system, advantageous stirring characteristics can advantageously be provided, in particular for the mixing of a content of a polycondensation reactor.

The system advantageously comprises the heating and/or cooling register, wherein at least the outer stirring blade and at least the further outer stirring blade circulate around the heating and/or cooling register on at least two mutually different sides in at least one operating state. In this way, temperature control of the medium for mixing in the vessel can advantageously be optimized. Thermal energy transmitted by the heating and/or cooling register to the medium for mixing can advantageously be distributed in a particularly homogeneous manner in the vessel. In this way, advantageously uniform chemical reaction conditions can be made possible throughout the entire vessel volume. "Circulate around" is to be understood in particular to mean that a stirring blade describes a circumscribed circle or an inscribed circle around the heating and/or cooling register. In particular, the further outer stirring blade and/or the corresponding further outer stirring blade describes a circumscribed circle around the heating and/or cooling register, whereas the outer stirring blade and/or the corresponding outer stirring blade describes an inscribed circle around the cooling and/or heating register.

Here, the stirring element device according to the invention is not intended to be restricted to the use and embodiment described above. In particular, the stirring element device according to the invention may, to perform a function described herein, have a number of individual elements, components and units that differs from a number stated herein.

DRAWINGS

Further advantages will emerge from the following description of the drawings. The drawings illustrate three exemplary embodiments of the invention. The drawings, the description and the claims contain numerous features in combination. A person skilled in the art will expediently also consider the features individually and combine them to form meaningful further combinations.

Figure 5:
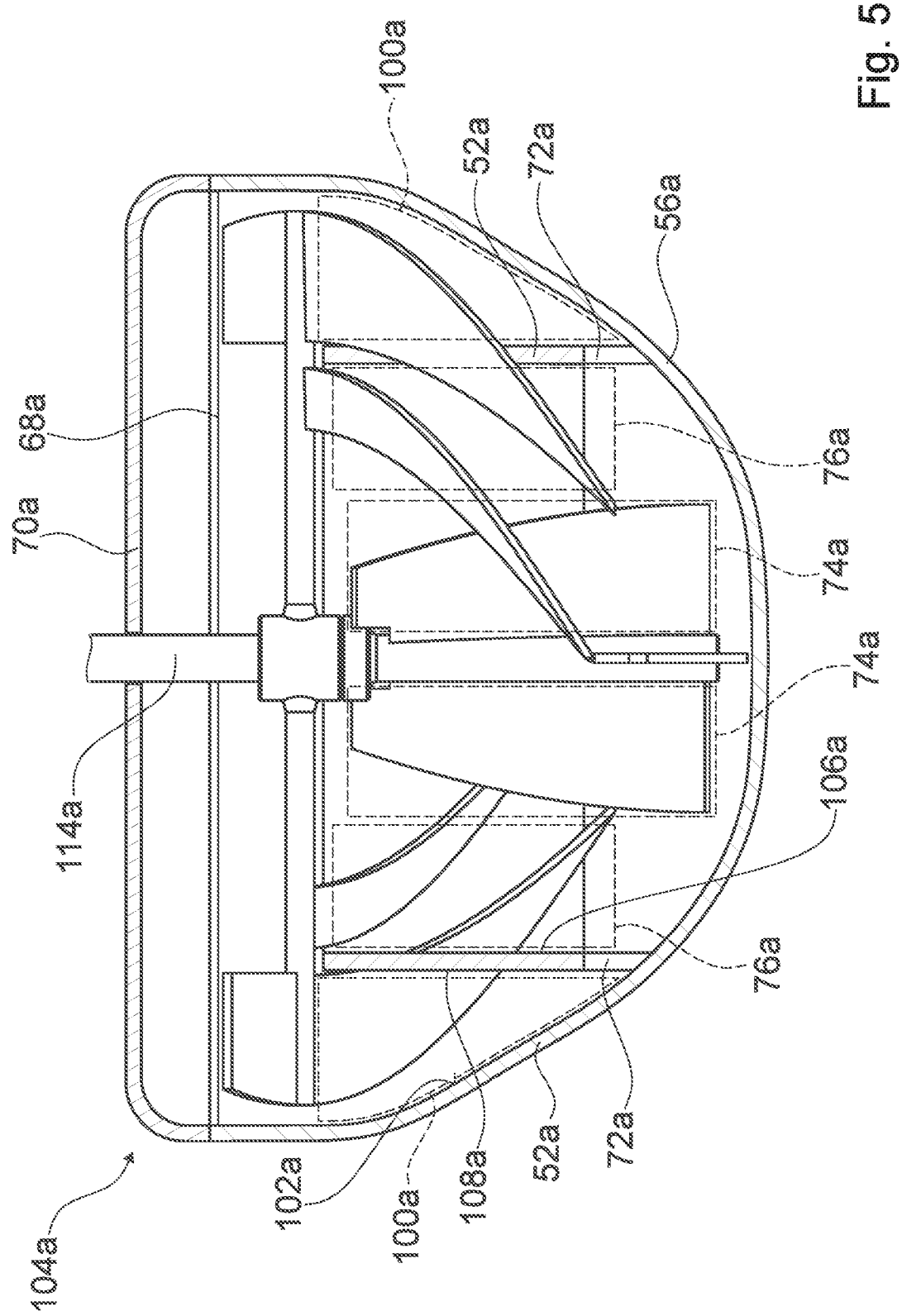
Figure 6:
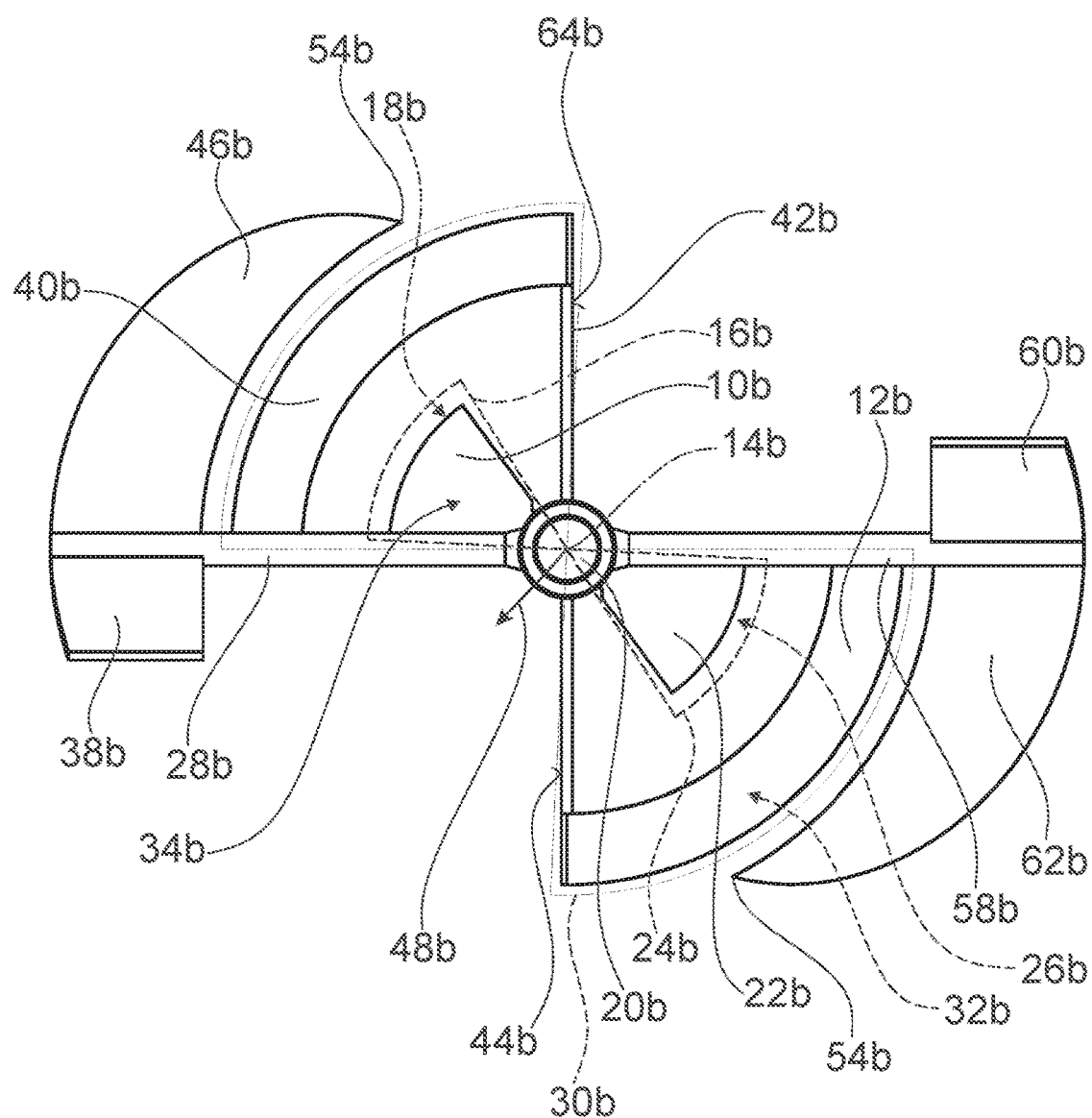
Figure 7:
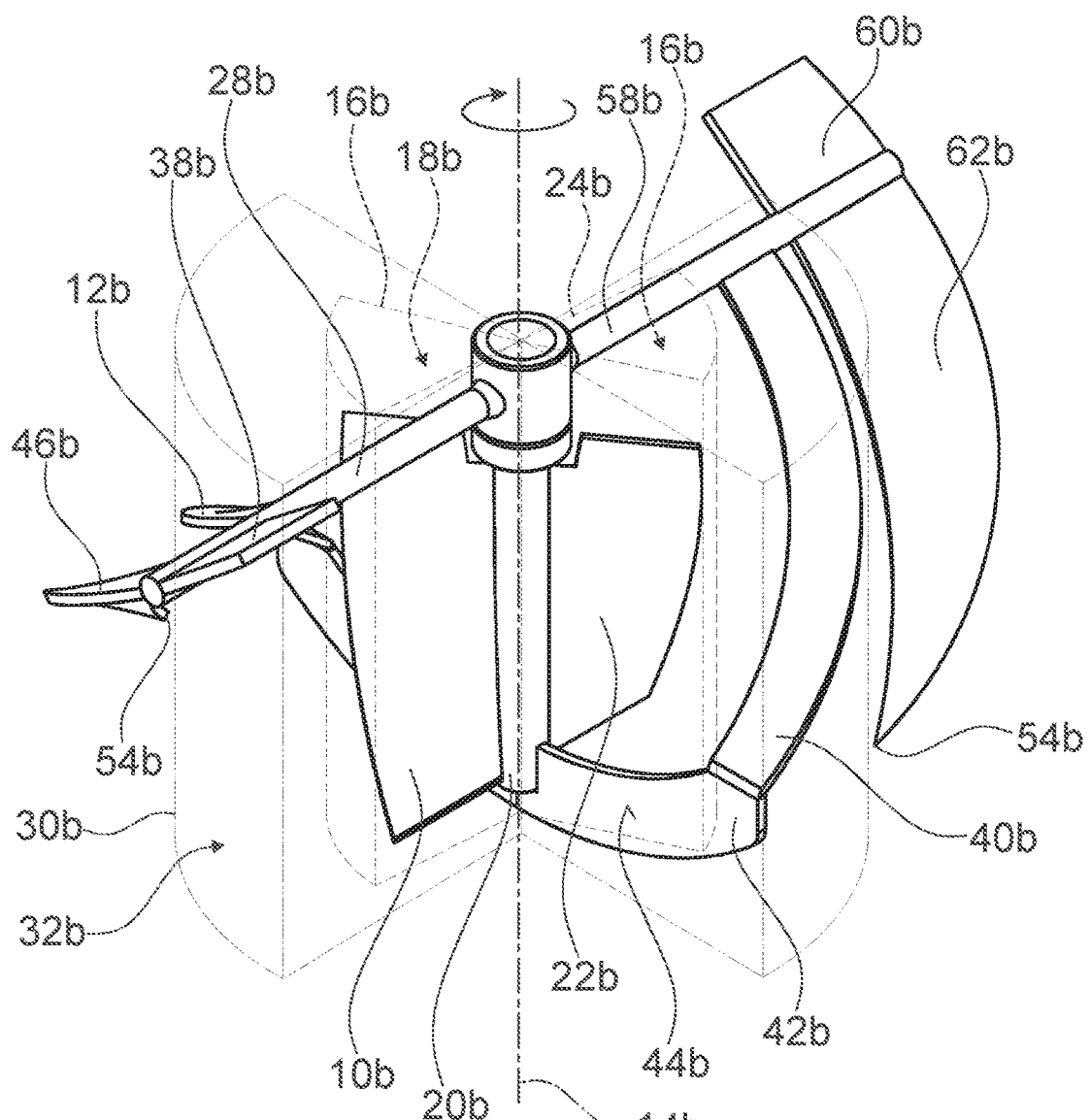
Figure 8:
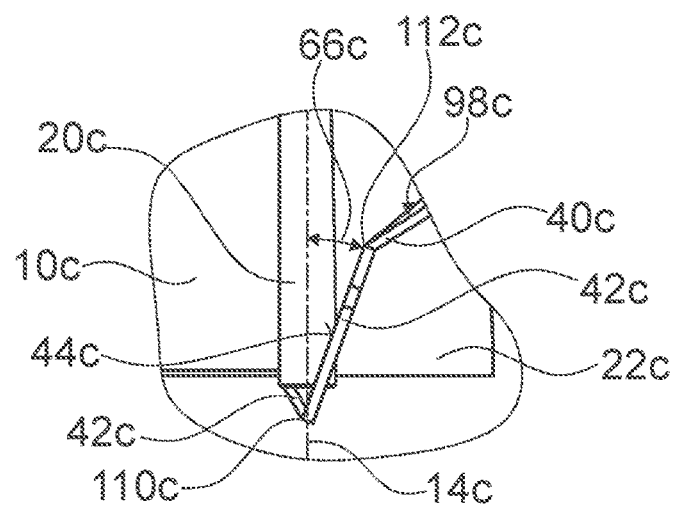
Figure 9:
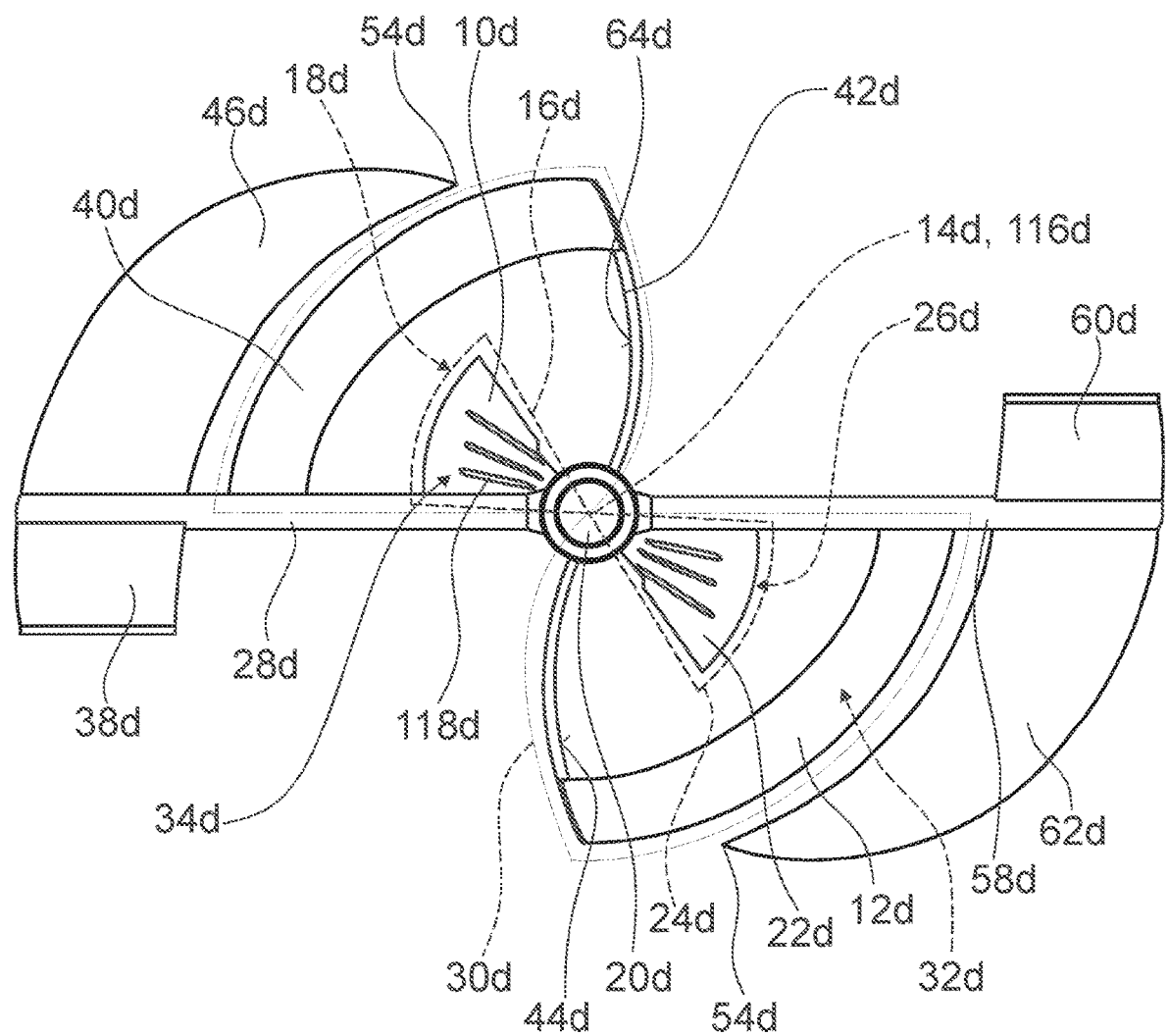
Figure 10:
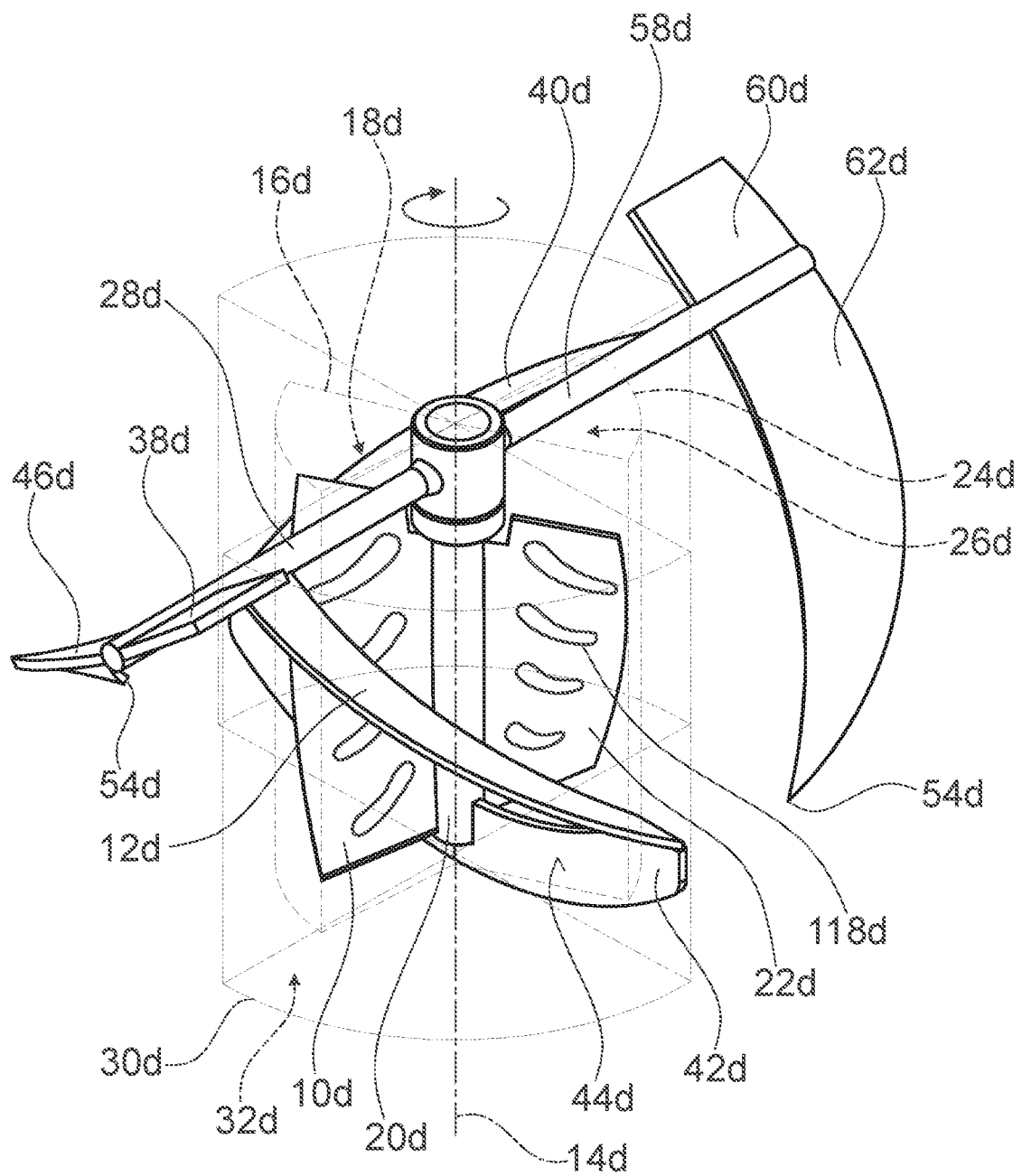
Figure 11:
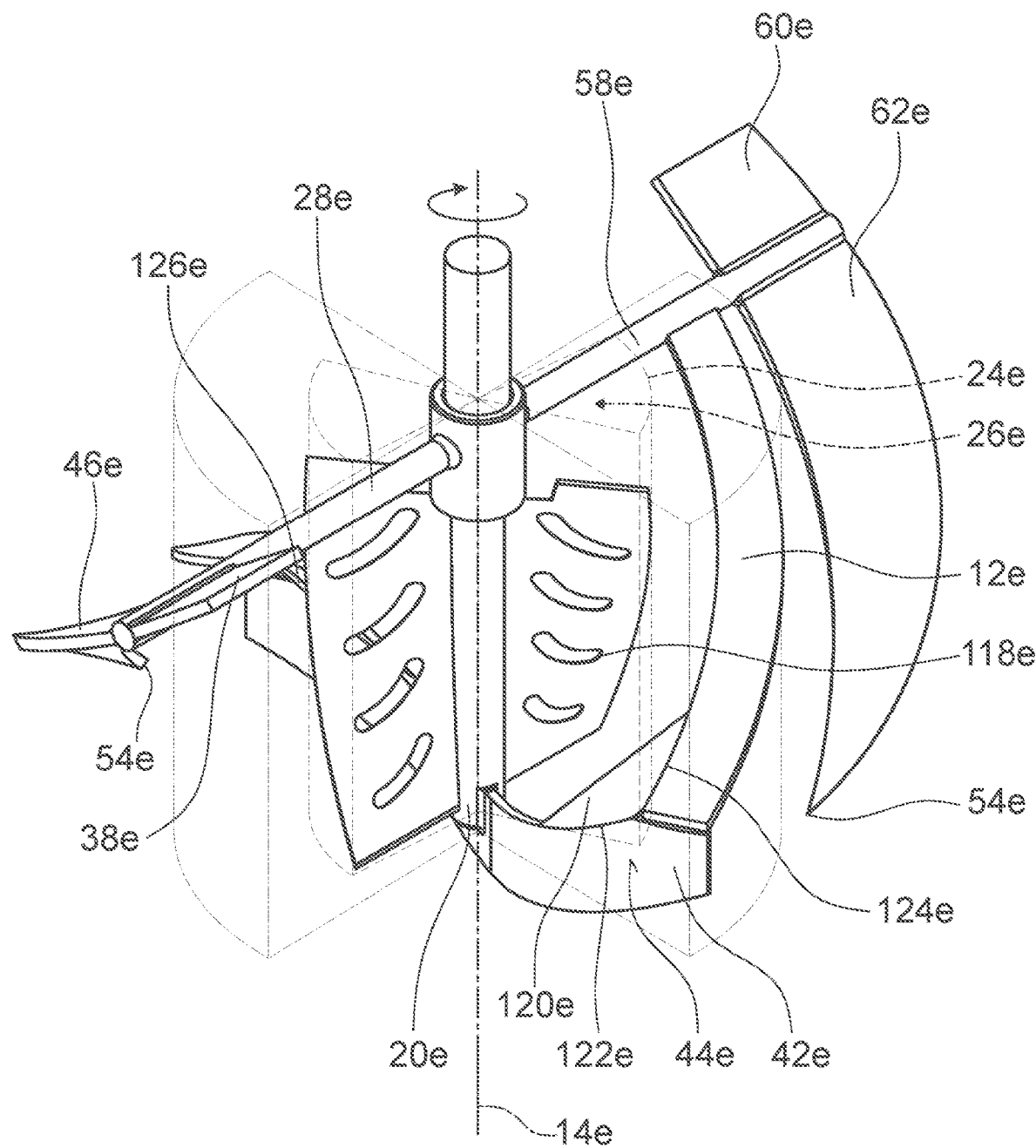

FIG. 5 shows a schematic lateral view of a system having the stirring element device, having a drive shaft and having a vessel, shown in section, with a heating and/or cooling register, shown in section, FIG. 6 shows a schematic plan view of an alternative stirring element device, FIG. 7 shows a schematic perspective view of the alternative stirring element device, FIG. 8 shows a detail of a schematic lateral view of a further alternative stirring element device, FIG. 9 shows a schematic plan view of a further alternative stirring element device, FIG. 10 shows a schematic perspective view of the further alternative stirring element device, and FIG. 11 shows a schematic plan view of a further alternative stirring element device.

DESCRIPTION OF THE EXEMPLARY EMBODIMENTS

Figure 1:
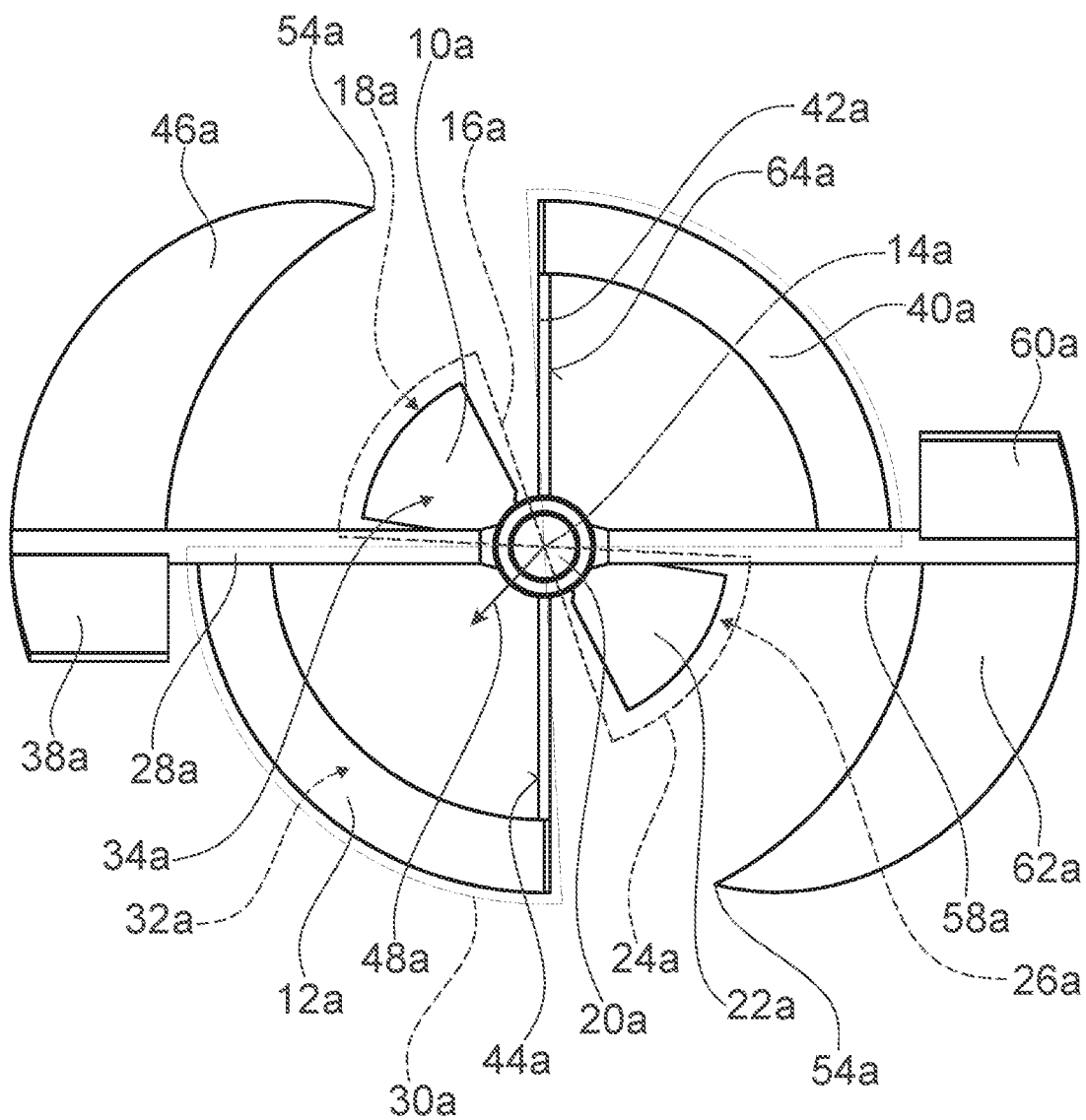
FIG. 1 shows a schematic plan view of a stirring element device.

FIG. 1 shows a stirring element device having an inner stirring blade 10a and a corresponding inner stirring blade 22a. The stirring element device is configured for mixing media with a wide range of viscosities, in particular in a polycondensation reactor. The inner stirring blade 10a is arranged entirely in a subregion 16a around the axis of rotation 14a which is equivalent to a cylinder sector 18a with a circular sector of less than 360° as base area. The corresponding inner stirring blade 22a is arranged entirely in a corresponding subregion 24a around the axis of rotation 14a which is equivalent to a corresponding cylinder sector 26a with a corresponding circular sector of less than 360° as base area. The subregion 16a and the corresponding subregion 24a do not overlap.

Figure 2:
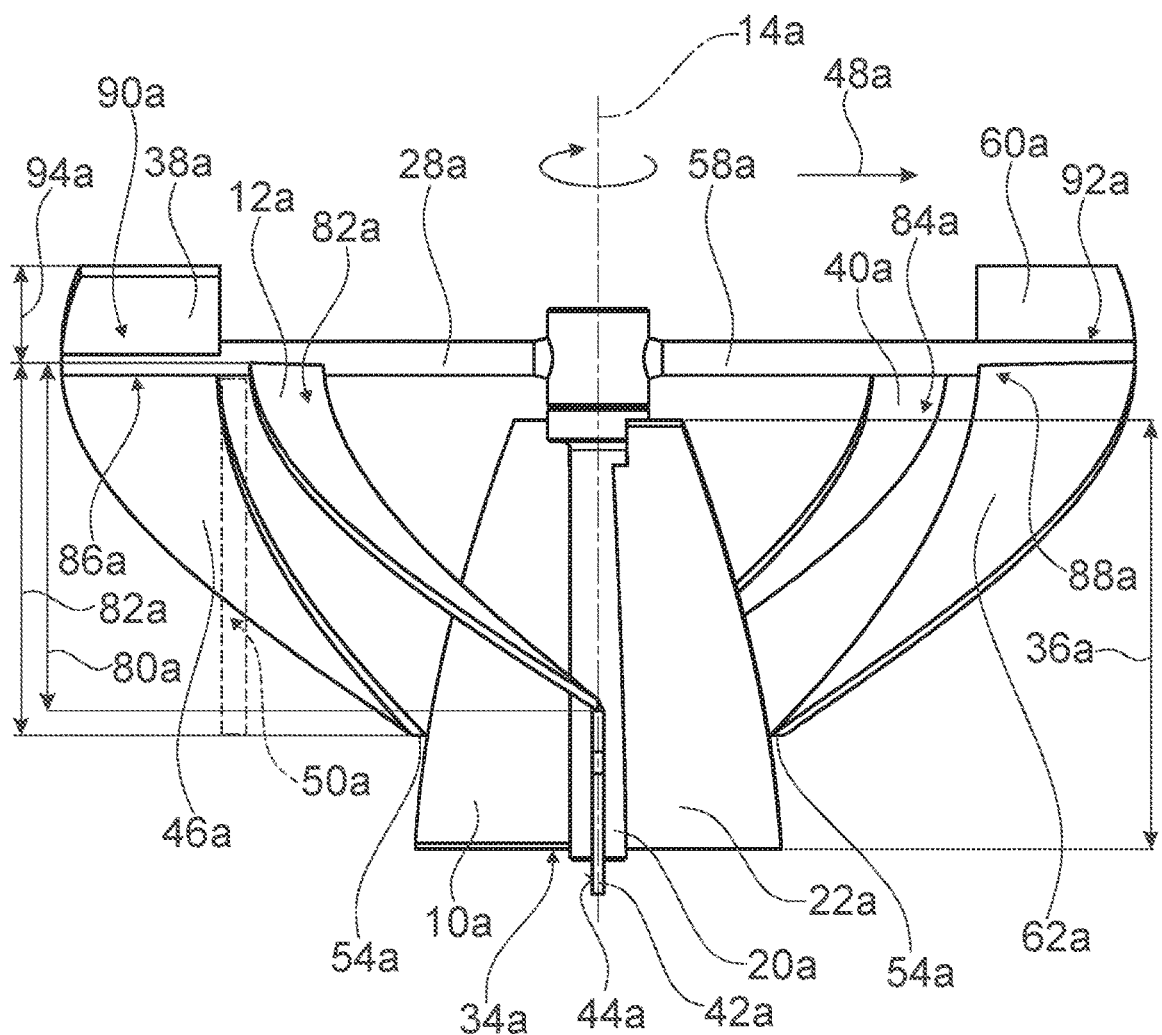
FIG. 2 shows a schematic lateral view of the stirring element device.
Figure 4:
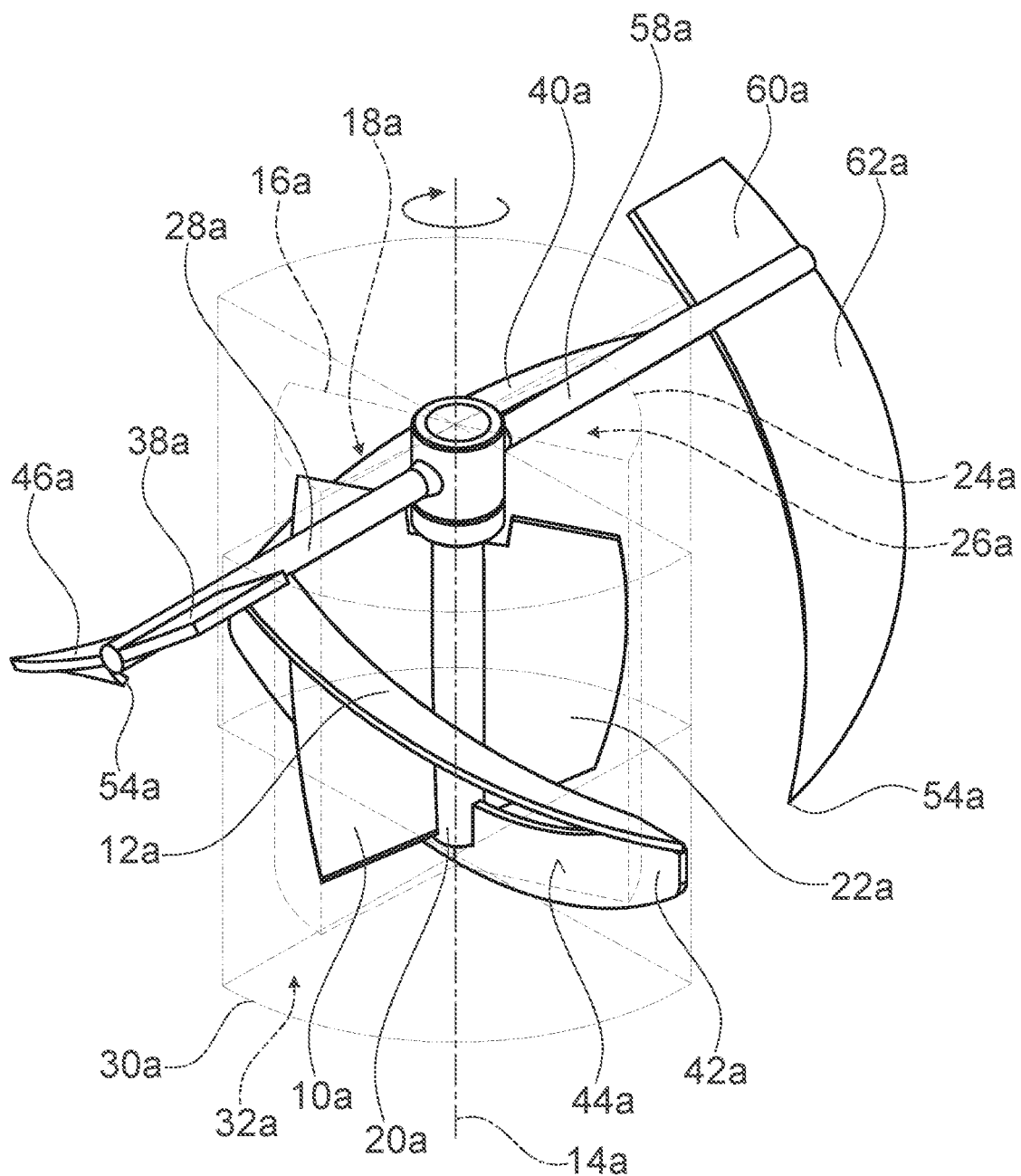
FIG. 4 shows a schematic, perspective view of the stirring element device.

The inner stirring blade 10a is inclined relative to an axis of rotation 14a. The corresponding inner stirring blade 22a is inclined relative to the axis of rotation 14a. An inclination angle range of the inner stirring blade 10a and of the corresponding inner stirring blade 22a amounts to in each case 60 to 90°. The inner stirring blade 10a and the corresponding inner stirring blade 22a are designed as screws 34a which are centered around the axis of rotation 14a (see FIG. 4). The inner stirring blade 10a and the corresponding inner stirring blade 22a are designed as left-handed helices. The inner stirring blade 10a has a thread pitch which is at least six times a total extent 36a of the inner stirring blade 10a parallel to the axis of rotation 14a (see FIG. 2). The corresponding inner stirring blade 22a has an identical thread pitch to the inner stirring blade 10a. The corresponding inner stirring blade 22a is of identical design to the inner stirring blade 10a and is arranged so as to be rotationally offset through 180° about the axis of rotation 14a.

The stirring element device has a rotary shaft 20a which is centered around the axis of rotation 14a. The inner stirring blade 10a makes contact, on one longitudinal side, with the rotary shaft 20a along a longitudinal direction of the rotary shaft 20a. The contact is uninterrupted and extends over the entire total extent 36a of the inner stirring blade 10a. The corresponding inner stirring blade 22a makes contact, on one longitudinal side, with the rotary shaft 20a along a longitudinal direction of the rotary shaft 20a.

The stirring element device has an outer stirring blade 12a and a corresponding outer stirring blade 40a. The outer stirring blade 12a is arranged entirely in a further subregion 30a around the axis of rotation 14a which is equivalent to a further cylinder sector 32a with a circular sector of less than 360° as base area. The outer stirring blade 12a and the corresponding outer stirring blade 40a have, in a radial direction 48a, a greater spacing to the axis of rotation 14a than the inner stirring blade 10a and/or the corresponding inner stirring blade 22a.

The outer stirring blade 12a is inclined relative to the axis of rotation 14a. The corresponding outer stirring blade 40a is inclined relative to the axis of rotation 14a. A smallest inclination angle of the outer stirring blade 12a and of the corresponding outer stirring blade 40a amounts to 30°. The outer stirring blade 12a and the corresponding outer stirring blade 40a are designed as helices which are centered around the axis of rotation 14a (see FIG. 4). The outer stirring blade 12a and the corresponding outer stirring blade 40a are designed as left-handed helices. The outer stirring blade 12a has a thread pitch which is at least four times a total extent 80a of the outer stirring blade 12a parallel to the axis of rotation 14a (see FIG. 2). The corresponding outer stirring blade 40a has an identical thread pitch to the outer stirring blade 12a. The corresponding outer stirring blade 40a is of identical design to the outer stirring blade 12a and is arranged so as to be rotationally offset through 180° about the axis of rotation 14a.

The stirring element device has a supporting arm 28a. The supporting arm 28a is arranged on the rotary shaft 20a. The supporting arm 28a and the rotary shaft 20a are connected rotationally conjointly to one another. The outer stirring blade 12a is arranged on the supporting arm 28a. An upper end 82a of the outer stirring blade 12a is connected rotationally conjointly to the supporting arm 28a. The stirring element device has a corresponding supporting arm 58a. The corresponding supporting arm 58a is arranged on the rotary shaft 20a. The corresponding supporting arm 58a and the rotary shaft 20a are connected rotationally conjointly to one another. The corresponding outer stirring blade 40a is arranged on the corresponding supporting arm 58a. An upper end 84a of the corresponding outer stirring blade 40a is connected rotationally conjointly to the corresponding supporting arm 58a.

Figure 3:
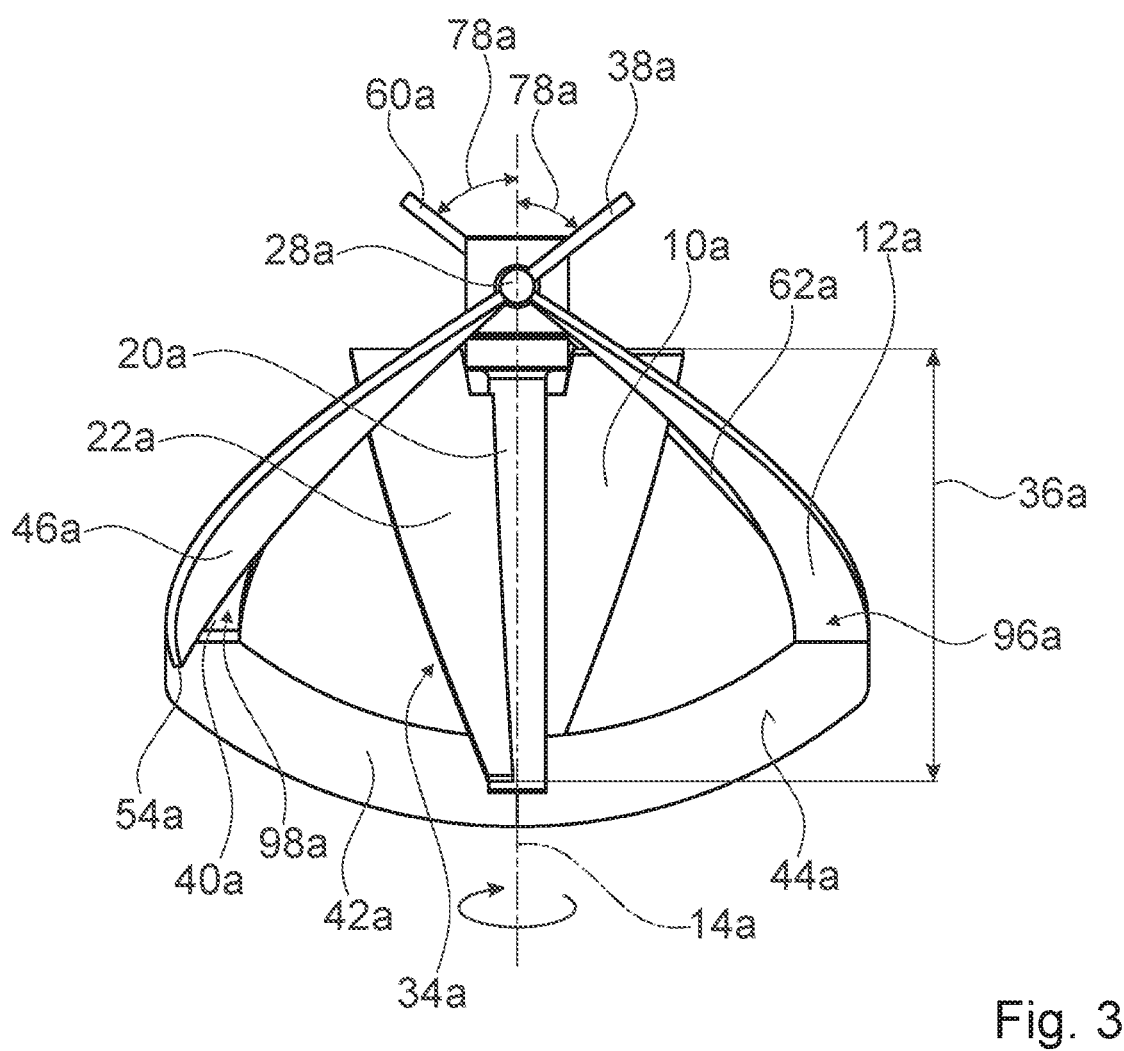
FIG. 3 shows a further schematic lateral view of the stirring element device.

The stirring element device has an anchor element 42a. The anchor element 42a connects the outer stirring blade 12a to the corresponding outer stirring blade 40a. The anchor element 42a is connected fixedly to a lower end 96a of the outer stirring blade 12a and to a lower end 98a of the corresponding outer stirring blade 40a (see FIG. 3). The anchor element 42a has an anchor stirring surface 44a and a corresponding anchor stirring surface 64a. The anchor stirring surface 44a and the corresponding anchor stirring surface 64a are oriented perpendicularly relative to the axis of rotation 14a. The anchor stirring surfaces 44a, 64a are configured for pushing a medium for mixing ahead of itself in the rotation operating mode. The rotary shaft 20a makes contact with the anchor element 42a. The rotary shaft 20a is fixedly connected to the anchor element 42a.

The stirring element device has a further outer stirring blade 46a and a corresponding further outer stirring blade 62a. The further outer stirring blade 46 and the corresponding further outer stirring blade 62 have, in a radial direction 48, a greater spacing to the axis of rotation 14a than the outer stirring blade 12a and/or the corresponding outer stirring blade 40a. The further outer stirring blade 46a and the corresponding further outer stirring blade 62a have a free end 54a which tapers to a point.

The further outer stirring blade 46a is inclined relative to the axis of rotation 14a. The further corresponding outer stirring blade 62a is inclined relative to the axis of rotation 14a. A smallest inclination angle of the further outer stirring blade 46a and of the further corresponding outer stirring blade 62a amounts to 35°. The further outer stirring blade 46a and the corresponding further outer stirring blade 62a are designed as helices which are centered around the axis of rotation 14a (see FIG. 4). The further outer stirring blade 46a and the corresponding further outer stirring blade 62a are designed as right-handed helices. The further outer stirring blade 46a has a thread pitch which is at least four times, in particular at least six times, a total extent 80a of the further outer stirring blade 46a parallel to the axis of rotation 14a (see FIG. 2). The corresponding further outer stirring blade 62a has an identical thread pitch to the further outer stirring blade 46a. The corresponding further outer stirring blade 62a is of identical design to the further outer stirring blade 46a and is arranged so as to be rotationally offset through 180° about the axis of rotation 14a.

The further outer stirring blade 46a is arranged on the supporting arm 28a. An upper end 86a of the further outer stirring blade 46a is connected rotationally conjointly to the supporting arm 28a. The corresponding further outer stirring blade 62a is arranged on the corresponding supporting arm 58a. An upper end 88a of the corresponding further outer stirring blade 62a is connected rotationally conjointly to the corresponding supporting arm 58a.

As viewed along the axis of rotation 14a, the outer stirring blade 12a and the corresponding outer stirring blade 40a have a curvature direction which is opposite to the curvature direction of the further outer stirring blade 46a and of the corresponding further outer stirring blade 62a.

The stirring element device has a surface stirring blade 38a. The stirring element device has a corresponding surface stirring blade 60a. The surface stirring blade 38a and/or the corresponding surface stirring blade 60a are, in at least one operating state, arranged entirely above the inner stirring blade 10a and/or the corresponding inner stirring blade 22a. The surface stirring blade 38a and/or the corresponding surface stirring blade 60a are, in one operating state, arranged entirely above the outer stirring blade 12a and/or the corresponding outer stirring blade 40a.

The surface stirring blade 38a is inclined relative to the axis of rotation 14a. The corresponding surface stirring blade 60a is inclined relative to the axis of rotation 14a. An angle 78a between a surface tangent of the surface stirring blade 38a and of the corresponding surface stirring blade 60a amounts to 55°. The surface stirring blade 38a and the corresponding surface stirring blade 60a are of planar, in particular curvature-free, design.

The surface stirring blade 38a is connected to the supporting arm 28a at a lower end 90a of the surface stirring blade 38a. The corresponding surface stirring blade 60a is connected to the corresponding supporting arm 58a at a lower end 92a of the corresponding surface stirring blade 60a. The surface stirring blade 38a and/or the corresponding surface stirring blade 60a are designed to be exchangeable, whereby adaptability of an extent 94a of the surface stirring blade 38a and/or of the corresponding surface stirring blade 60a parallel to the axis of rotation 14a to a filling level of a medium for mixing can advantageously be made possible.

The inner stirring blade 10a, the corresponding inner stirring blade 22a, the outer stirring blade 12a and the corresponding outer stirring blade 40a are rotatable about the common axis of rotation 14a. The inner stirring blade 10 and the outer stirring blade 12a have identical angular speeds in the rotation operating mode. The further outer stirring blade 46a and the corresponding further outer stirring blade 62a are rotatable about the common axis of rotation 14a. The surface stirring blade 38a and the corresponding surface stirring blade 60a are rotatable about the common axis of rotation 14a. Each of the stirring blades 10a, 12a, 38a, 40a, 46a, 60a, 62a has an identical angular speed in the rotation operating mode.

The inner stirring blade 10a and the corresponding inner stirring blade 22a pass through in each case one region of a cylinder volume 74a during a rotation. The outer stirring blade 12a and the corresponding outer stirring blade 40a pass through in each case one region of a hollow cylinder wall volume 76a during a rotation. The further outer stirring blade 46a and the corresponding further outer stirring blade 62a pass through in each case one region of a further volume 100a during a rotation. The cylinder volume 74a, the hollow cylinder wall volume 76a and the further volume 100a do not overlap one another.

That region of the hollow cylinder wall volume 76a which is swept by the outer stirring blade 12a in the rotation operating mode and that region of the hollow cylinder wall volume 76a which is swept by the further outer stirring blade 46a in a rotation operating mode are radially spaced apart from one another, forming an intermediate space 50a. The intermediate space 50a is configured for receiving a heating and/or cooling register 52a (see FIG. 5).

FIG. 5 schematically shows a system 104a having the stirring element device, a drive shaft 114a, a heating and/or cooling register 52a and a vessel 56a. The vessel 56a and the heating and/or cooling register 52a are illustrated in section. The vessel 56a has a cover 70a. The vessel 56a engages fully around the stirring element device. An internal shape of the vessel 56a is adapted to a body of revolution formed by the stirring element device in the rotation operating mode, so as to minimize a spacing between an inner wall 102a of the vessel 56a and the body of revolution. The vessel 56a has a filling level marking 68. The filling level marking 68a indicates an intended filling level in an operating mode. The extent 94a of the surface stirring blade 38a is adapted to the intended filling level in the operating mode. The drive shaft 114a is connected rotationally conjointly to the rotary shaft 20a. The drive shaft 114a is configured for transmitting a rotational movement to the rotary shaft 20a. The drive shaft 114a is driven by means of an external drive unit (not shown).

The system 104a has the heating and/or cooling register 52a. The heating and/or cooling register 52a is arranged within the vessel 56a. The heating and/or cooling register 52a is of radially symmetrical design. The heating and/or cooling register 52a is designed as a hollow cylinder. The heating and/or cooling register 52a is mounted on the inner wall 102a by means of connecting pieces 72a. At least one connecting piece 72a has at least one feed line and/or discharge line (not shown) for at least one cooling and/or heating medium.

In a rotation operating mode, the stirring element device is configured for rotating clockwise as viewed from above, as shown for example in FIG. 1. Here, the inner stirring blade 10a and the corresponding inner stirring blade 22a generate, in the medium for mixing, a flow with a flow component directed downward parallel to the axis of rotation 14a. In the rotation operating mode, the outer stirring blade 12a and the corresponding outer stirring blade 40a generate, in the medium for mixing, a flow with a flow component directed downward parallel to the axis of rotation 14a. In the rotation operating mode, the further outer stirring blade 46a and the corresponding further outer stirring blade 62a generate, in the medium for mixing, a flow with a flow component directed upward parallel to the axis of rotation 14a.

In an operating state, the outer stirring blade 12a and at least the further outer stirring blade 46a circulate around the heating and/or cooling register 52a on two mutually opposite sides of the heating and/or cooling register 52a. The further outer stirring blade 46a describes a circumscribed circle around an outer side 108a of the heating and/or cooling register 52a. The outer stirring blade 12a describes an inscribed circle around an inner side 106a of the heating and/or cooling register 52a.

FIGS. 6 to 11 show four further exemplary embodiments of the invention. The following descriptions and the drawings are restricted substantially to the differences between the exemplary embodiments, wherein, with regard to identically designated components, in particular with regard to components with the same reference designations, reference may basically also be made to the drawings and/or to the description of the other exemplary embodiments, in particular of FIGS. 1 to 5. To distinguish between the exemplary embodiments, the alphabetic character a has been added as a suffix to the reference designations of the exemplary embodiment in FIGS. 1 to 5. In the exemplary embodiments of FIGS. 6 to 8, the alphabetic character a has been replaced with the alphabetic characters b to e.

FIG. 6 shows a schematic plan view of an alternative stirring element device having an inner stirring blade 10b, a corresponding inner stirring blade 22b, an outer stirring blade 12b, a corresponding outer stirring blade 40b, a further outer stirring blade 46b and a corresponding further outer stirring blade 62b. The inner stirring blade 10b is arranged entirely in a subregion 16b around the axis of rotation 14b which is equivalent to a cylinder sector 18b with a circular sector of less than 360° as base area. The corresponding inner stirring blade 22b is arranged entirely in a corresponding subregion 24b around the axis of rotation 14b which is equivalent to a corresponding cylinder sector 26b with a corresponding circular sector of less than 360° as base area. The outer stirring blade 12b is arranged entirely in a further subregion 30b around the axis of rotation 14b which is equivalent to a further cylinder sector 32b with a circular sector of less than 360° as base area.

The subregion 16b and the further subregion 30b partially overlap. The inner stirring blade 10b and the outer stirring blade 12b are curved differently. The outer stirring blade 12b and the corresponding outer stirring blade 40b each have a thread direction which is identical to a thread direction of the further outer stirring blade 46b and of the corresponding further stirring blade 62b (see FIG. 7). The outer stirring blade 12b and the corresponding outer stirring blade 40b have a right-handed curvature in particular as seen in a lateral view of an operational installation direction. The inner stirring blade 10b and the corresponding inner stirring blade 22b have a left-handed curvature in particular as seen in a lateral view of an operational installation direction.

FIG. 8 shows a detail of a schematic lateral view of an anchor element 42c of a further alternative stirring element device. The anchor element 42c has an anchor stirring face 44c which is oriented at an angle relative to the axis of rotation 14c.

The anchor element 42c and the axis of rotation 14c span an angle 66c. In a rotation operating mode, a lower edge 110c of the anchor element 42c leads an upper edge 112c of the anchor element 42c. In this way, it is advantageously possible to achieve further improved mixing characteristics of the stirring element device. Preferably, a part of the anchor element 42c which is arranged entirely in a half-space on one side of a rotary shaft 20c is angled oppositely in relation to an oppositely situated part of the anchor element 42c, which is arranged entirely on a half-space which differs from the half-space, such that, in the rotation operating mode, the lower edge 110c leads the upper edge 112c in each part of the anchor element 42c.

FIG. 9 and FIG. 10 show a further alternative stirring element device. The anchor element 42d is curved along its main extent direction. The anchor element 42d has an S-shaped curvature. A curvature of the anchor element 42d has an inflection point 116d. The inner stirring blade 10d and the corresponding inner stirring blade 22d have in each case four recesses 118d. The recesses 118d have in each case one curved hole of the inner stirring blade or of the corresponding inner stirring blade 22d. The recesses 118d are arranged periodically.

FIG. 11 shows a further alternative stirring element device. The stirring element device has a vane element 120e. The vane element 120e is arranged at a subregion of the anchor element 42e which is spaced apart to a maximum extent from the axis of rotation 14e. The vane element 120e is of plate-like form. The vane element 120e has a further main extent plane (not illustrated) running perpendicular to a main extent plane (not illustrated) of the anchor element 42e. The vane element 120e is designed as an at least substantially triangular metal plate. The vane element 120e is connected to the anchor element 42e. The vane element 120e is connected to an edge, which is curved towards the axis of rotation 14e, of the anchor element 42e. The vane element 120e is connected to the outer stirring blade 12e. The vane element 120e is, at a first side 122e, entirely welded to the anchor element 42e. The vane element 120e is, at a second side 124e, entirely welded to the outer stirring blade 12e. The stirring element device has a further vane element 126e. The further vane element 126e is arranged at an oppositely situated edge of the anchor element 42e. The further vane element 126e is connected to the corresponding outer stirring blade 40e. The further vane element 126e is, with regard to its other characteristics, of identical design to the vane element 120e, for which reason a further description of the further vane element 126e will not be given at this juncture.

REFERENCE DESIGNATIONS

10 Inner stirring blade
12 Outer stirring blade
14 Axis of rotation
16 Subregion
18 Cylinder sector
20 Rotary shaft
22 Corresponding inner stirring blade
24 Corresponding subregion
26 Corresponding cylinder sector
28 Supporting arm
30 Further subregion
32 Further cylinder sector
34 Screw
36 Total extent
38 Surface stirring blade
40 Corresponding outer stirring blade
42 Anchor element
44 Anchor stirring surface
46 Further outer stirring blade
48 Radial direction
50 Intermediate space
52 Heating and/or cooling register
54 Free end
56 Vessel
58 Corresponding supporting arm
60 Corresponding surface stirring blade
62 Corresponding further outer stirring blade
64 Corresponding anchor stirring surface
66 Angle
68 Filling level marking
70 Cover
72 Connecting piece
74 Cylinder volume
76 Hollow cylinder wall volume
78 Angle
80 Total extent
82 Upper end
84 Upper end
86 Upper end
88 Upper end
90 Lower end
92 Lower end
94 Extent
96 Lower end
98 Lower end
100 Further volume
102 Inner wall
104 System
106 Inner side
108 Outer side
110 Lower edge
112 Upper edge
114 Drive shaft
116 Inflection point
118 Recess
120 Vane element 122 Side
124 Side
126 Vane element

The invention claimed is:

1. A stirring element device, in particular for mixing media with a wide range of viscosities, in particular for a polycondensation reactor, having at least one inner stirring blade and at least one outer stirring blade which are rotatable about a common axis of rotation, wherein at least the inner stirring blade is inclined at least section-wise relative to the axis of rotation, wherein at least the inner stirring blade is arranged entirely in a subregion around the axis of rotation which is equivalent to a cylinder sector with a circular sector of less than 360° as base area, wherein the inner stirring blade is formed at least partially as a screw centered around the axis of rotation, and wherein the inner stirring blade has a thread pitch which amounts to at least three times a total extent of the inner stirring blade parallel to the axis of rotation.

2. The stirring element device as claimed in claim 1, further comprising at least one corresponding inner stirring blade, which is arranged entirely in a corresponding subregion around the axis of rotation which is equivalent to a corresponding cylinder sector with a circular sector as base area, wherein the subregion and the corresponding subregion do not overlap.

3. The stirring element device as claimed in claim 1, further comprising a rotary shaft which is centered around the axis of rotation and which, at least section-wise, makes contact with the inner stirring blade along a longitudinal direction of the rotary shaft.

4. The stirring element device as claimed in claim 1, wherein the outer stirring blade is arranged entirely in a further subregion around the axis of rotation which is equivalent to a further cylinder sector with a circular sector of less than 360° as base area.

5. The stirring element device as claimed in claim 1, wherein the inner stirring blade and the outer stirring blade have identical angular speeds in at least one rotation operating mode.

6. The stirring element device as claimed in claim 1, wherein the inner stirring blade and the outer stirring blade are curved differently.

7. The stirring element device as claimed in claim 1, further comprising at least one surface stirring blade which, in at least one operating state, is arranged at least partially above the outer stirring blade.

8. The stirring element device as claimed in claim 1, further comprising at least one corresponding outer stirring blade and at least one anchor element which connects at least the outer stirring blade to the corresponding outer stirring blade, wherein the anchor element has an anchor stirring surface which is oriented relative to the axis of rotation.

9. The stirring element device as claimed in claim 8, further comprising a rotary shaft which is centered around the axis of rotation and which, at least section-wise, makes contact with the inner stirring blade along a longitudinal direction of the rotary shaft, wherein the rotary shaft makes contact with the anchor element and is fixedly connected to the anchor element.

10. The stirring element device as claimed in claim 1, further comprising at least one further outer stirring blade which, in a radial direction, has a greater spacing to the axis of rotation than the outer stirring blade.

11. The stirring element device as claimed in claim 10, wherein, as viewed along the axis of rotation, the outer stirring blade has a curvature direction opposite to the curvature direction of the further outer stirring blade.

12. The stirring element device as claimed in claim 10, wherein a region swept by the outer stirring blade in a rotation operating mode and a further region swept by the further outer stirring blade in a rotation operating mode are radially spaced apart from one another, forming an intermediate space which is configured for receiving a heating and/or cooling register.

13. The stirring element device as claimed in claim 10, wherein the further outer stirring blade has a free end which tapers to a point.

14. The stirring element device as claimed in claim 1, wherein the inner stirring blade has at least one recess.

15. The stirring element device as claimed in claim 8, wherein the anchor element is curved along its main extent direction.

16. The stirring element device as claimed in claim 8, further comprising at least one vane element which is arranged on the anchor element and/or on the outer stirring blade.

17. A system, in particular stirring and/or reactor system, having a stirring element device as claimed in claim 1, and having a vessel which at least partially engages around the stirring element device.

18. A system, in particular stirring and/or reactor system, having a stirring element device as claimed in claim 12 and having a vessel which at least partially engages around the stirring element device, further comprising the heating and/or cooling register, wherein at least the outer stirring blade and at least the further outer stirring blade circulate around the heating and/or cooling register on at least two mutually different sides in at least one operating state.

* * * * *